United States Patent

Sufi

Patent Number: 5,859,082
Date of Patent: Jan. 12, 1999

[54] COMPOSITION AND METHOD FOR INSULATING FOAM

[76] Inventor: Aniq Sufi, 10387 Amberwood Circle, Fountain Valley, Calif. 92708

[21] Appl. No.: 964,871

[22] Filed: Nov. 5, 1997

[51] Int. Cl.⁶ .............................. C08L 61/00; C08L 63/00; C08G 18/54; C08G 18/58

[52] U.S. Cl. ......................... 521/136; 521/135; 521/137; 521/172

[58] Field of Search ................................. 521/136, 172, 521/135, 137

[56] References Cited

U.S. PATENT DOCUMENTS

| | | | |
|---|---|---|---|
| 4,237,238 | 12/1980 | DeGuiseppi et al. | |
| 4,243,755 | 1/1981 | Mary et al. | 521/136 |
| 4,454,254 | 6/1984 | Reichel et al. | 521/136 |
| 4,766,158 | 8/1988 | Fuzesi et al. | |
| 4,774,268 | 9/1988 | Mary et al. | 521/136 |
| 4,904,703 | 2/1990 | Sufi. | |

*Primary Examiner*—Morton Foelak
*Attorney, Agent, or Firm*—Fish & Richardson P.C.

[57] ABSTRACT

An insulating foam composition, comprising a polyisocyanate component and a resin component that includes a polyepoxide, an aromatic polyester polyol, and a melamine resin. The foam will remain stable at temperatures up to 400° F., continuously, and up to 450° F., intermittently, and can be applied by spraying, pouring, or frothing directly onto surface of high temperature industrial apparatus.

39 Claims, No Drawings

COMPOSITION AND METHOD FOR INSULATING FOAM

BACKGROUND OF THE INVENTION

1. Field of the Invention

The present invention relates to a composition and method for producing an insulating foam. More particularly, the present invention relates to a composition and method for producing a foam for insulating industrial apparatus that reach relatively high temperatures.

2. Description of Related Art

Insulating foams are used in industrial buildings such as factories, refineries, and chemical processing plants. When used to insulate pipes, water heaters, or other high temperature apparatus, the foam helps prevent heat from being transferred to the surrounding environment. Because industrial substances, such as high pressure steam, can often reach temperatures as high as 400° F., the presence of such insulating foam on a steam conduit lowers energy costs and protects people and other equipment that may be nearby.

Fiberglass and calcium silicate foams are commonly used for insulation in commercial and residential facilities. In addition to degrading over long exposure to high temperatures, the heat resistance of such materials is reduced by exposure to moisture. Thermoplastic foams produced by an isocyanurate reaction better protect against moisture, but after long term exposure to these high temperatures, begin to degrade, scorch, crack, or expand to volumes too large to be useful. At high temperatures, isocyanurate foams having a K factor greater than 0.14 to 0.15 tend to release fluorocarbon gas, increasing the density of the foam and reducing the resistance to heat transfer.

Accordingly, a need exists for an insulating foam that can withstand temperatures of 400° F. and higher and is characterized by better thermal stability, better flame retardancy, more resistance to high temperature deformation, and greater ease in utility of the foam. The present invention provides such an insulating foam.

SUMMARY OF THE INVENTION

The details of the preferred embodiment of the present invention are set forth in the description below. Once the details of the invention are known, numerous additional innovations and changes will become obvious to one skilled in the art.

In a first aspect, the present invention is a composition for a high temperature foam. The composition includes a polyisocyanate component having an isocyanate equivalent weight of between about 80 and 175. The composition also includes a resin component a resin component in an amount between about 20 and 50 percent by weight. The resin component includes (1) a polyepoxide in an amount of between about 0 and 17 percent by weight of the resin component, (2) an aromatic polyester polyol in an amount between about 20 and 30 percent by weight of the resin component, and (3) a melamine resin in an amount between about 15 and 30 percent by weight of the resin component. Optionally, the resin component may also have a catalyst to promote isocyanate trimerization reaction of the polyepoxide, the aromatic polyester polyol and the melamine resin with the polyisocyanate; a blowing agent to decrease foam density and increase volume of foam; a surfactant as a cell controlling agent; and an emulsifier.

In another aspect, the present invention is an insulating foam composition. The composition includes a polyisocyanate component in an amount between about 50 and 80 percent by weight with an isocyanate equivalent weight of between about 80 and 175. The composition also includes a resin component in an amount between about 20 and 50 percent by weight. The resin component has (1) an aromatic polyester polyol in an amount sufficient to create urethane linkages to make the insulating foam composition dimensionally stable and non-friable; (2) a polyepoxide in an amount sufficient to initiate cellular polymers; and (3) a melamine resin in an amount sufficient to impart cross-linking of aromatic structures.

In still another aspect, the present invention is a method of insulating a high-temperature industrial apparatus. The method includes the step of applying to the high-temperature industrial apparatus an insulating foam composition that includes the following components: (1) a polyisocyanate component in an amount between about 50 and 80 percent by weight with an isocyanate equivalent weight of between about 80 and 175; and (2) a resin component in an amount between about 20 and 50 percent by weight. The resin component includes a polyepoxide in an amount of between about 0 and 17 percent by weight of the resin component, an aromatic polyester polyol in an amount between about 20 and 30 percent by weight of the resin component, and a melamine resin in an amount between about 15 and 30 percent by weight of the resin component.

DETAILED DESCRIPTION OF THE INVENTION

Throughout this description, the preferred embodiment and examples shown should be considered as exemplars, rather than as limitations on the present invention.

In the present invention, commercially available materials are used to prepare a high temperature, stable, insulating foam composition. This foam resists degradation and deformation at temperatures up to 400° F., continuously, and up to 450° F., intermittently. The insulating foam includes a polyisocyanate component and a resin component. The polyisocyanate and resin components are combined in a ratio sufficient to provide a thermoplastic, moisture resistant foam. This ratio can be anywhere from about 4:1 to about 1:1 parts polyisocyanate component to resin component, although the preferred ratio is about 2:1. Alternatively, a portion of the resin component could be added to the polyisocyanate component.

The polyisocyanate component has a isocyanate equivalent of between about 80 and 175, preferably about 133, and a functionality between about 2.0 and 3.2, preferably about 3.0, with an NCO Index between about 400 and 725, preferably about 525. Advantageously, and in order to obtain resins or foams having exceptionally high heat resistance and structural strength, the preferred polyisocyanates are the methylene polyphenylisocyanates, particularly those polyisocyanate mixtures that contain from about 30 to an 85 percent by weight of methylenebis(phenyl)isocyanate. The remainder of the mixture comprises polyethylene polyphenyl polyisocyanates of functionality greater than 2.0. Such polyisocyanates are commonly available from Bayer Corp, Dow Chemical Co., BASF Corp., and ICI Chemicals. The preferred polyisocyanate is Mondor 489, available from Bayer Corp. As noted above, a portion of the resin component (described in detail below) could be added to the isocyanate.

Polyisocyanates are often used in the production of polyurethane by forming linkages in a reaction with compounds with two or more active hydrogen containing groups, like polyester polyols. The isocyanates of the present invention may include: 2,4-tolylene diisocyanate, 2,6-tolylene diisocyanate, 4,4'-methylenebis(phenyl isocyanate), dianisidine diisocyanate, tolidine diisocyanate, hexamethylene diisocyanate m-xylene diisocyanate, Isophorone diisocyanate, 1,5-napthalene diisocyanate, p-phenylene diisocyanate, 1,4-diethylbenzene-β,β'- diisocyanante, and other di- and higher polyisocyanates. Mixtures of two or more of the above isocyanates can be used, such as mixtures of the 2,4- and the 2,6-isomers of tolylene diisocyanate, mixtures of 2,4'- and 4,4'-isomers of methylene bis(phenyl isocyanate), and the like. In addition to the 4,4'-methylenebis(phenyl isocyanate) and its 2,4'-isomer and 4,4'-isomer, which can be employed as the isocyanate component, other modified forms of these isocyanates can also be used. For example, the polyisocyanate component can be methylenebis(phenyl isocyanate) that has been converted to a stable liquid at temperatures of about 15° C. and higher, using known processes.

The resin component of the foam composition is a mixture of an aromatic polyester polyol, a polyepoxide, and a melamine resin. Optionally, a surfactant, emulsifier, catalyst, and blowing agent may be added to the resin component.

In this description, the term "aromatic polyester polyol" is intended to mean a polyhydroxy organic compound having phenolic hydroxy groups. The polyol is used to form thermoplastic urethane linkages, making the foam strong, non-friable, and dimensionally stable in high heat. The polyol also promotes flame retardancy in the foam.

The aromatic polyester polyol is present an amount between about 20 and 45 percent by weight of the resin component, preferably about 24.25 percent by weight. The aromatic polyol can be defined as a resin obtained from the transesterification of a polyalkylene with a glycol. The terephthalate can be scrap or virgin polyethylene terephthalate or dimethyl terephthalate or phthalic anhydride. The glycol used in the transesterification process can be any one or a combination of the following glycols: ethylene glycol, 1,3-propylene glycol, 1,2-propylene glycol, 1,4-butane diol, 1,2-hexane diol, 1,6-hexane diol, diethylene glycol, dipropylene glycol, tripropylene glycol, the polyoxyethylene glycols, and polypropylene glycols falling within a molecular weight range of about 40 to 60. The preferred group of glycols includes ethylene glycol and diethylene glycol, with the latter being the most preferred. The viscosities of the aromatic polyester polyols measured in cps at 25° C. fall in the range of about 1000 to 500,000, preferably about 1500 to 150,000, and most preferably about 2000 to 50,000. The hydroxyl number values fall within a range of about 15 to 750, preferably about 30 to 550, and most preferably about 100 to 550. The acid number falls within a range of from about 0.5 to 40 and preferably from about 0.5 to 10.

The preferred aromatic polyester polyol is characterized by a viscosity in cps at 25° C. of about 5,000 to 30,000; a hydroxyl number within a range from about 240 to 370; and an acid number of about 0.5 to 8. The preferred polyol is a dimethyl terephthalate based polyol with a hydroxyl number of about 315, such as the commercially available Terate 203 or 2031 from Hoechst-Celanese Corp. Other commercially available polyols are C570 from Cook Composites and Terol 350 from Oxid Chemicals.

As noted above, the resin component also includes a polyepoxide. The polyepoxide is present in the resin component in an amount between about 0 and 17 percent by weight of the resin component, preferably about 15 percent. The term polyepoxide refers to any compound containing two or more epoxides or oxirane groups. The epoxide can have either an aliphatic or an aromatic backbone. The preferred epoxide is phenol based and characterized by the presence of at least two epoxy groups, each of which is present in a substituent attached to a cyclic hydrocarbon compound. A wide variety of polyepoxides of different molecular weights are commercially available. The glycidyl ethers of non-fused polynuclear phenols represented by the general formula, are preferred as the polyepoxide:

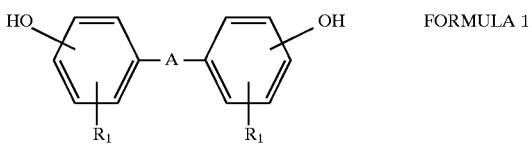

FORMULA 1

In Formula 1, above, "$R_1$", represents from 0 to 4 from the class consisting of halogen and lower-alkyl. "A" is a bridging group selected from a member of the class consisting of: an alkyl, an ether, a sulfone, a carbonyl, a thiol, and a single covalent bond. Bis(glycidyl ethers) are illustrative of the types of epoxy resins described by Formula 1. Examples of bis(glycidyl ethers) include without limitation: 4,4'-dihydroxydiphenylsulfone, 4,4'-dihydroxybiphenyl, 4,4'-dihydroxybenzophenone, di(4-hydroxyphenyl) alkanes, 3,3-di(hydroxyphenyl)pentane, 2-(3-hydroxyphenyl)-2-(4-hydroxyphenyl)butane, 1-phenyl-1-(2-hydroxyphenyl)-1-(3-hydroxyphenyl)propane, 1-phenyl -1,1-di(4-hydroxyhexyl) alkanes, bis(3-bromo-4-hydroxyphenyl) alkanes, 2,2-bis(3-bromo-4-hydroxyphenyl)propionitrile, bis(3-bromo-4-hydroxyphenyl)sulfone, and bis(3,5-dibromo-4-hydroxyphenyl)sulfone.

The preferred polyepoxide is 2,2-di(4-hydroxyphenyl) propane. This diepoxide is also commonly known as Bisphenol A. Bisphenol A is commercially available from Dow Chemical Co. and Shell Chemical Co. The preferred Bisphenol A is GY 6010 from Ciba-Geigy Corp. Bisphenol A can contain epichlorohydrin. The polyepoxide in the resin component also reacts with the polyisocyanate to form a strong plastic useful for controlling friability in the foam, making the foam more stable at high temperatures.

Other polyepoxides may also be used in this invention. Examples of acceptable homocyclic polyepoxides are: (1) the glycidyl ethers of polyhydric mononuclear and fused ring phenols, (2) the glycidyl ethers of novolac resins, (3) dicyclopentadione dioxide, (4) vinyl cyclohexane dioxide, (5) the dicyclohexyl oxide carboxylates, and (6) the glycidyl derivatives of aromatic amines. These homocyclic polyepoxides are well-known in the art and can be prepared by well-known methods, as described, for example, in: U.S. Pat. No. 4,766,158, which is incorporated by reference.

A melamine resin is added to the resin component in an amount between about 15 to 30 percent by weight of the resin component, preferably about 25 percent. Highly methylated melamine resins are commercially available from Cytec Industries, Monsanto, and Reichhold. The melamine resin may be dissolved in an aliphatic alcohol, like isobutanol, to aid in incorporation into the resin component. The melamine resin may be already dissolved in the aliphatic alcohol (e.g., isobutanol) as is the preferred melamine resin, Cymel 327. Cymel 303 could also be used, but it requires higher catalyst levels and higher blowing agent levels. Because the polyepoxide by itself is not enough to yield a stable high temperature foam, the strength and durability of the foam is increased with the addition of the melamine resin.

The melamine resin in the resin component may be selected from the group consisting of: highly methylated melamine-formaldehyde resins, high imino melamine-formaldehyde resins, partially methylated melamine-formaldehyde resins, benzoguanamine-formaldehyde resins, glycouril-formaldehyde resins, and carboxyl modified melamine-formaldehyde resins. The preferred melamine-formaldehyde resins are from the group of highly methylated, high imino and partially methylated resins, with the most preferred resins being high imino and highly methylated melamine resins having the following characteristics: a solids content from about 75 to 99 percent by weight; a viscosity from about 70 to 150 poise at 25° C. a degree of polymerization (as defined by the average number of triazine units per molecule) of about 1.2 to 3.0; a maximum free formaldehyde content from about 0.05 to 1.0 percent, and a monomer content from about 45 to 80 percent by weight.

The trimerization catalyst employed can be any catalyst known to those skilled in the art that will catalyze the trimerization of an organic isocyanate compound to form the isocyanurate moiety. For typical isocyanate trimerization catalysts, see *The Journal of Cellular Plastics*, November/December 1975, page 329; U.S. Pat. Nos. 3,745,133; 3,896,052; 3,899,443; 3,903,018; 3,954,684; and 4,101,465; the disclosures of these references being incorporated by reference herein.

Typical catalyst classes are the glycine salts and tertiary amine trimerization catalysts and alkali metal carboxylic salts disclosed in the above patents and mixtures of the various types of catalysts. Preferred species within the classes are sodium N-(2-hydroxy-5-nonyl phenyl) methyl-N-methylglycinate and tertiary amine trimerization catalysts such as Air Product's Curithane 52 and TMR-4, respectively. Preferably, the TMR-4 is added at about 0.05 to 1.0 percent by weight and most preferably at about 0.1 to 0.5 percent by weight of the resin component. The Curithane 52 is added at about 1.0 to 10.0 percent by weight, and most preferably at about 5.0 to 8.0 percent by weight of the resin component.

A blowing agent may be added to the resin component to control the density of the foam. As the density is reduced, the amount of foam produced increases. Typically, as the density decreases, the produced foam is not as susceptible to high temperatures. With the present invention, the density can be as low as between about 1.85 and 2.2, and the insulating foam can still remain stable.

Typical blowing agents are volatile organic solvents. These include halogenated aliphatic hydrocarbons, such as chlorofluorocarbons, hydrofluorocarbons, hydrochlorofluorocarbons, and pentanes, like n-pentane, cyclo pentane, and iso-pentane. The preferred blowing agent is a dichlorofluoroethane that is commercially available as 141-B Blowing Agent from Allied-Signal. Other commercial blowing agents are available from Dupont, Atochem, and LaRouche. The amount of blowing agent used depends on the desired density. The blowing agent can be added to the resin component in an amount between about 15 and 30 percent by weight of the resin component, preferably about 25 percent by weight.

Similarly, water can be added to the resin component to reduce the density of the insulating foam in an amount between about 0.0 and 1.5 percent by weight of the resin component. Preferably, about 0.5 percent by weight of water is added to the resin component.

Surfactants can be added to the resin component as a cell stabilizer. Surfactants create a finer and more compact cell structure to add strength to the foam. Silicon based organic polymers are typically used to control cell structure, such as DC 193 from Air Products, or L5420, L5421, and L5422 from Union Carbide Co. B84-PI Surfactant from Goldschmidt Chemicals is preferably added to the resin component in a range of between about 1 and 5 percent by weight, preferably about 4 percent by weight.

Optionally, an emulsifier can be added to make the materials of the resin component more miscible and to help disperse the ingredients in the insulating foam mixture. The preferred emulsifier is a nonyl phenol ethoxylate, such as Surfonic N-95 from Huntsman Chemicals.

A "one-shot" method is preferably used to prepare the insulating foam. Both the isocyanate and resin components are prepared separately. Just before application to a high temperature apparatus, the two components are mixed together in one-shot. The two components can be mixed by hand-stirring, or may be processed through conventional foam dispensing units, such as low pressure, high shear, mixing machines or high pressure impingement mixing machines. The two component mixture can also be frothed using gases such as nitrogen, carbon dioxide, CFC-12, and HFC-22. The foam can be sprayed, poured, or frothed, and then allowed to cure.

The following example describes the preferred process of making and using the invention. It will be understood, however, that other processes can be used to make the invention and that the exemplary process described below is not intended as a limitation.

EXAMPLE 1

Table 1 below describes the weight percentages of seven insulating foams prepared by the one-shot method described above. The isocyanate and resin components were combined with a bench-top, high-shear mixer. Under "Reactivity" in the table below, "Start of Rise" is defined as the time it takes the mixture to begin to react. "Rise Time" is defined as the total time of reaction of the polyol, polyepoxide, and polyisocyanate and of expansion of the insulating foam.

TABLE 1

Stable Polyisocyanurate Insulating Foams
(Values indicate percentage of respective composition by weight)

| Formulation Additive | Foam A | Foam B | Foam C | Foam D | Foam E | Foam F | Foam G |
|---|---|---|---|---|---|---|---|
| RESIN COMPOSITION | | | | | | | |
| Terate 203 or 2031 | 21.5 | 15 | — | 22.3 | 21 | 24.25 | 24.25 |
| Cymel 327 | 25 | 29.5 | 39.5 | 45 | 21 | 25 | 25 |
| GY 6010 Epoxy Resin | 21.5 | 25 | 30 | — | 22.75 | 15 | 15 |
| B 84-PI Surfactant | 2 | 2 | 2 | 2 | 2 | 4 | 4 |
| Surfonic N-95 | — | — | — | 5 | 4 | — | — |
| TMR-2 Catalyst | — | — | — | 1.7 | 3 | — | — |
| TMR-3 Catalyst | — | 3 | 3 | — | — | — | — |
| TMR-4 Catalyst | 1 | 0.5 | 0.5 | — | 0.25 | 0.25 | 0.25 |
| Curithane 52 | 4 | — | — | — | — | 6 | 6 |
| Water | 0.5 | 0.5 | 0.5 | 0.5 | 0.5 | 0.5 | 0.5 |
| 141-B Blowing Agent | 24.5 | 24.5 | 24.5 | 23.5 | 25.5 | 25 | 25 |
| ISOCYANATE COMPOSITION | | | | | | | |
| Mondur 489 | 200 | 200 | 200 | 200 | 200 | — | 200 |
| Mondur MR | — | — | — | — | — | 200 | — |
| NCO Index | 500 | 550 | 650 | 725 | 500 | 525 | 525 |
| REACTIVITY - Hand Mix, 20 seconds with a 2500 rpm mixer | | | | | | | |
| Start of rise, sec. | 10 | 8 | 8 | 15 | 10 | 15 | 10 |
| Rise Time, sec. | 140 | 90 | 55 | 75 | 40 | 120 | 100 |
| Density, pounds/cu. ft. | 2.5 | 2.2 | 1.89 | 2.6 | 2.65 | 2.20 | 2.53 |

Terate 203 or 2031, a product of Hoechst-Celanese Corp., is a DMT based aromatic polyester polyol with OH number 315. Cymel 327, a product of Cytec Industries, is a highly methylated melamine-formaldehyde resin. The GY 6010 epoxy resin, a product of Ciba-Geigy, is a bisphenol A diepoxide. The B 84-PI Surfactant, a product of Goldschmidt Chemicals, is a silicone based surfactant. Surfonic N-95, a product of Huntsman Chemicals, is a nonyl phenol ethoxylate. All TMR catalysts are acid-blocked tertiary amine polyisocyanurate catalysts. Each of the listed TMR catalysts is a product of Air Products. The Curithane 52, also a product of Air Products, is a glycine salt based polyisocyanurate catalyst. The 141-B Blowing Agent, a product of Allied-Signal, is a dichlorofluoroethane. The Mondur 489, a product of Bayer Corp., is a polyisocyanate having an isocyanate equivalent of 133 and a functionality of 3.0. The Mondur MR, also a product of Bayer Corp., is a polyisocyanate having an isocyanate equivalent of 133 and a functionality of 2.7.

The resulting reaction mixtures were poured into 6"×12"×12" open molds. The direction of rise of the foam upon curing was in the 6 inch direction. The molds were then disassembled after 30 minutes, and the foam samples were allowed to cure for 30 days. Samples were cut into 3 inch cubes. Each sample was then placed in an oven preheated to 400° F. The changes in dimensions of the foam samples were then measured after 1, 7, and 14 days. Table 2 below shows the results of the thermal stability tests for Foams A through G.

TABLE 2

Thermal Stability of foam after exposure at 400° F.

| | Foam A | Foam B | Foam C | Foam D | Foam E | Foam F | Foam G |
|---|---|---|---|---|---|---|---|
| % Vol. Increase - 24 hrs. | −25 | −22.7 | Rupture | −20.6 | −12.8 | −22 | +4.5 |
| % Vol. Increase - 7 days | * | * | * | * | * | * | +5.4 |
| % Vol. Increase - 14 days | — | — | — | — | — | — | +2.35 |

*Discontinued Further Test

Foams A through F showed an average decrease of approximately 22 percent. Foam G has a slight volume increase, while Foam C ruptured within 24 hours of exposure to the high temperature.

Following a hand mix screening of the various insulating foams, Foam G was then processed through an Admiral low-pressure, high-shear mixing machine. The two stream system was processed at a total chemical throughput of a nominal 60 pounds per minute. Free rise pours were made in an open mold measuring 24"×36"×48". The direction of the foam rise was in the 24" direction. A slight modification in the catalyst level was made to speed the reaction times of the foam system. Also, a parallel foam system, Foam H, was processed using Cymel 303, a highly alkylated, low imino melamine resin. Minor adjustments were made to the catalyst and blowing agent levels to accommodate the inherent differences between Cymel 327 and Cymel 303. Table 3 shows the formulation of the machine poured Foam G and Foam H.

TABLE 3

Machine Pours of Foam G and H
(Values indicate percentage of respective composition by weight)

| Formulation | Foam G | Foam H |
| --- | --- | --- |
| Terate 203/2031 Aromatic polyester polyol | 27.1 | 22.0 |
| Cymel 327 Melamine Resin | 25 | — |
| Cymel 303 Melamine Resin | — | 25.0 |
| GY 6010 Epoxy Resin | 15 | 15.0 |
| B-84-PI Silicone Surfactant | 4 | 4.0 |
| TMR-4 Polyisocyanurate catalyst | 0.4 | 0.4 |
| Curithane 52 Polyisocyanurate Catalyst | 5 | 5.0 |
| Dabco K-15 Polyisocyanurate Catalyst | — | 2.0 |
| Water | 0.5 | 0.5 |
| 141-B Blowing Agent | 23 | 26.5 |
| NCO Index | 525 | 550 |

The physical properties and the dimensional stability of the above two formulations are shown in Table 4 Below.

TABLE 4

Dimensional Stability

| | Foam G | Foam H |
| --- | --- | --- |
| Density, pcf | 2.42 | 2.53 |
| Compressive Strength psi @ 10% Deflection | 27.61 | 31.90 |
| Closed Cell Content, % | 88.0 | 87.0 |
| Water Absorption, psf | 0.035 | 0.035 |
| Dry Heat, 400° F., % volume change | | |
| After 1 day | +0.1 | +0.08 |
| After 7 days | −0.2 | −0.28 |
| After 14 days | −2.4 | −3.50 |
| After 28 days | −4.4 | −5.2 |
| Dry Heat, 450° F., % volume change | | |
| After 1 day | +14.6 | — |
| After 7 days | +1.5 | — |
| After 28 days | −11.9 | — |

Both of the above formulations show exceptional resistance to change upon continuous exposure to temperatures of 400° F., and intermittent exposure to 450° F.

The high temperature insulating foam described herein provides a stable form of insulation that does not decompose in the presence of heat as high as 450° F., even over an extended period of time.

A number of embodiments of the present invention have been described. Nevertheless, it will be understood that various modifications may be made without departing from the spirit and scope of the invention. Accordingly, it is to be understood that the invention is not to be limited by the specific illustrated embodiment, but only by the scope of the appended claims.

What is claimed is:

1. A rigid insulating foam composition that is resistant to dimensional change, degradation, and cracking at temperatures up to 400° F. continuous and up to 450° F. intermittent, comprising:
   a. a polyisocyanate component in an amount between about 50 and 80 percent by weight with an isocyanate equivalent weight of between about 80 and 175; and
   b. a resin component in an amount between about 20 and 50 percent by weight, including:
      i. a polyepoxide in an amount of between about 0 and 17 percent by weight of the resin component,
      ii. an aromatic polyester polyol in an amount between about 20 and 30 percent by weight of the resin component, and
      iii. a melamine resin in an amount between about 15 and 30 percent by weight of the resin component.

2. The insulating foam composition of claim 1 wherein the polyisocyanate has a functionality of between about 2.0 and 3.2.

3. The insulating foam composition of claim 1 wherein the melamine resin is a member of the group consisting of highly methylated melamine-formaldehyde resin, high imino melamine-formaldehyde resins, partially methylated melamine-formaldehyde resins, benzoguanamine-formaldehyde resins, glycouril-formaldehyde resins, and carboxyl modified melamine-formaldehyde resins.

4. The insulating foam composition of claim 1 wherein the polyepoxide is a phenolic based epoxy with an epoxide equivalent greater than 150.

5. The insulating foam composition of claim 1 wherein the aromatic polyester polyol is a resin obtained from the transesterification of a polyalkylene terephthalate with a glycol.

6. The insulating foam composition of claim 5 wherein the polyalkylene terephthalate is a member of the group consisting of polyethylene terephthalate, dimethyl terephthalate, and phthalic anhydride; and wherein the glycol is a member of the group consisting of ethylene glycol, 1,3-propylene glycol, 1,2-propylene glycol, 1,4-butane diol, 1,2-hexane diol, 1,6-hexane diol, diethylene glycol, dipropylene glycol, tripropylene glycol, the polyoxyethylene glycols, and polypropylene glycol.

7. The insulating foam composition of claim 1 wherein the resin component further includes an emulsifier.

8. The insulating foam composition of claim 7 wherein the emulsifier includes nonyl phenol ethoxylate.

9. The insulating foam composition of claim 1 wherein the resin component further comprises a blowing agent in an amount between about 15 and 30 percent by weight of the resin component.

10. The insulating foam composition of claim 9 wherein the blowing agent is a member of the group consisting of hydrocarbons, hydro-fluorocarbons, chloro-fluorocarbons, and hydro-chloro-fluorocarbons.

11. The insulating foam composition of claim 10 wherein the blowing agent is a pentane.

12. The insulating foam composition of claim 1 wherein the resin component further comprises at least one surfactant in an amount between about 1 and 5 percent by weight of the resin component.

13. The insulating foam composition of claim 12 wherein the surfactant is silicone based.

14. The insulating foam composition of claim 1 wherein the resin component further comprises at least one catalyst in an amount between about 1 and 9 percent by weight of the resin component.

15. The insulating foam composition of claim 14 wherein the catalyst is a tertiary amine polyisocyanurate catalyst.

16. A rigid insulating foam composition that is resistant to dimensional change degradation, and cracking at temperatures up to 400° F. continuous and up to 450° F. intermittent, comprising:
   a. a polyisocyanate component in an amount between about 50 and 80 percent by weight with an isocyanate equivalent weight of between about 80 and 175; and
   b. a resin component in an amount between about 20 and 50 percent by weight, including:
      i. an aromatic polyester polyol in an amount sufficient to create urethane linkages to make the insulating foam composition dimensionally stable and non-friable;

ii. a polyepoxide in an amount sufficient to initiate cellular polymers;

iii. a melamine resin in an amount sufficient to impart cross-linking of aromatic structures.

17. The insulating foam composition of claim 16 wherein the polyisocyanate has a functionality between about 2.0 and 3.2.

18. The insulating foam composition of claim 16 wherein the aromatic polyester polyol, the polyepoxide, and the melamine resin are each included in an amount sufficient to provide increased heat stability and flame retardation.

19. The insulating foam composition of claim 16 wherein the melamine resin is a member of the group consisting of highly methylated melamine-formaldehyde resin, high imino melamine-formaldehyde resin, partially methylated melamine-formaldehyde resin, benzoguanamine-formaldehyde resin, glycouril-formaldehyde resin, and carboxyl modified melamine-formaldehyde resin.

20. The insulating foam composition of claim 16 wherein the polyepoxide is a phenolic based epoxy.

21. The insulating foam composition of claim 16 wherein the aromatic polyester polyol is a resin obtained from the transesterification of a polyalkylene terephthalate with a glycol.

22. The insulating foam composition of claim 21 wherein the polyalkylene terephthalate is a member of the group consisting of polyethylene terephthalate, dimethyl terephthalate, and phthalic anhydride; and wherein the glycol is a member of the group consisting of ethylene glycol, 1,3-propylene glycol, 1,2-propylene glycol, 1,4-butane diol, 1,2-hexane diol, 1,6-hexane diol, diethylene glycol, dipropylene glycol, tripropylene glycol, the polyoxyethylene glycols, and polypropylene glycol.

23. The insulating foam composition of claim 16 wherein the resin component further includes an emulsifier.

24. The insulating foam composition of claim 23 wherein the emulsifier includes nonyl phenol ethoxylate.

25. The insulating foam composition of claim 16 wherein the resin component further includes a blowing agent in an amount sufficient to lower the density of the insulating foam composition and increase the yield of foam.

26. The insulating foam composition of claim 25 wherein the blowing agent is a member of the group consisting of hydrocarbons, hydro-fluorocarbons, chloro-fluorocarbons, and hydro-chloro-fluorocarbons.

27. The insulating foam composition of claim 26 wherein the blowing agent lowers the density of the insulating foam composition to between about 1.85 and 2.2 pounds per cubic foot.

28. The insulating foam composition of claim 16 wherein the resin component further includes at least one surfactant in an amount sufficient to act as a cell controlling agent.

29. The insulating foam composition of claim 28 wherein the surfactant is silicone based.

30. The insulating foam composition of claim 16 wherein the resin component further comprises at least one catalyst in an amount sufficient to promote isocyanate trimerization reaction of the polyepoxide, polyester polyol, and melamine resin with the polyisocyanate.

31. The insulating foam composition of claim 30 wherein the catalyst is a tertiary amine polyisocyanurate catalyst.

32. A method of insulating a high-temperature industrial apparatus, comprising the step of applying to the high-temperature industrial apparatus a rigid insulating foam composition that is resistant to dimensional change, degradation, and cracking at temperatures up to 400° F. continuous and up to 450° F. intermittent and that includes:

a. a polyisocyanate component in an amount between about 50 and 80 percent by weight with an isocyanate equivalent weight of between about 80 and 175; and b. a resin component in an amount between about 20 and 50 percent by weight, including:

i. a polyepoxide in an amount of between about 0 and 17 percent by weight of the resin component, ii. an aromatic polyester polyol in an amount between about 20 and 30 percent by weight of the resin component, and iii. a melamine resin in an amount between about 15 and 30 percent by weight of the resin component.

33. The method of claim 32 wherein the step of applying the insulating foam composition is performed by either spraying, pouring, or frothing the insulating foam composition directly onto the high-temperature industrial apparatus.

34. The method of claim 32 wherein the high-temperature industrial apparatus can emit heat to a temperature as high as about 450° F.

35. A rigid insulating foam composition that is resistant to dimensional change, degradation, and cracking at temperatures up to 400° F. continuous and up to 450° F. intermittent, comprising:

a. a polyisocyanate component in an amount between about 50 and 80 percent by weight with an isocyanate equivalent weight of between about 80 and 175; and b. a resin component in an amount between about 20 and 50 percent by weight, including:

i. a polyepoxide in an amount of between about 0 and 17 percent by weight of the resin component, ii. an aromatic polyester polyol in an amount between about 20 and 30 percent by weight of the resin component, iii. a melamine resin in an amount between about 15 and 30 percent by weight of the resin component, and iv. a blowing agent including pentane.

36. The insulating foam composition of claim 35 wherein the blowing agent of the resin includes is a member of the group consisting of n-pentane, cyclo-pentane, and iso-pentane.

37. The insulating foam composition of claim 36 wherein the blowing agent is present in an amount between about 15 and 30 percent by weight of the resin component.

38. The insulating foam composition of claim 35 wherein the resin component includes a blowing agent in an amount sufficient to lower the density of the insulating foam composition and increase the yield of foam.

39. The insulating foam composition of claim 35 wherein the blowing agent lowers the density of the insulating foam composition to between about 1.85 and 2.2 pounds per cubic foot.

* * * * *